US006874755B2

(12) United States Patent
Bircann

(10) Patent No.: US 6,874,755 B2
(45) Date of Patent: Apr. 5, 2005

(54) FIXED SHAFT MOISTURE INTRUSION SHIELD FOR A VALVE PINTLE

(75) Inventor: Raul A. Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 11 days.

(21) Appl. No.: 10/641,831

(22) Filed: Aug. 15, 2003

(65) Prior Publication Data

US 2004/0065861 A1 Apr. 8, 2004

Related U.S. Application Data

(60) Provisional application No. 60/415,648, filed on Oct. 2, 2002.

(51) Int. Cl.[7] ................................................ F16K 31/44

(52) U.S. Cl. .............. 251/214; 251/129.15; 251/129.17

(58) Field of Search ............... 251/214, 129.15–129.17; 123/568.21

(56) References Cited

U.S. PATENT DOCUMENTS 5,911,401 A * 6/1999 Hrytzak et al. ........ 251/129.15
6,439,213 B2 8/2002 Bircann et al.
6,453,934 B1 9/2002 Bircann et al.
6,467,754 B2 10/2002 Bircann et al.
6,484,705 B2 11/2002 Bircann et al.
6,497,226 B2 12/2002 Bircann et al.
6,543,746 B2 4/2003 Bircann et al.
6,634,346 B2 10/2003 Bircann et al.

* cited by examiner

*Primary Examiner*—Tuan Nguyen
(74) *Attorney, Agent, or Firm*—Patrick M. Griffin

(57) ABSTRACT

A solenoid-actuated pintle valve assembly having a pintle shaft extending from a metering base sub-assembly into a solenoid actuator sub-assembly, the pintle shaft being equipped with a radially-extending fixed shield outside the metering base sub-assembly. The shield moves axially with the pintle during valve actuation and is located on the shaft so that when the pintle is in the valve-closed position, the shield cooperates with the pintle bushing to form an effective impedance to gas leakage from the metering base sub-assembly along the pintle shaft. When the valve is in the fully open position at the opposite extreme of pintle travel, the shield cooperates with an armature shield in the actuator to prevent entrance of gases into the solenoid. The invention is especially useful for exhaust gas recirculation valves on internal combustion engines.

5 Claims, 2 Drawing Sheets

FIXED SHAFT MOISTURE INTRUSION SHIELD FOR A VALVE PINTLE

RELATIONSHIP TO OTHER APPLICATIONS AND PATENTS

The present application claims priority from U.S. Provisional Patent Application, Ser. No. 60/415,648, filed Oct. 2, 2002.

TECHNICAL FIELD

The present invention relates to pintle valves; more particularly, to exhaust gas recirculation (EGR) pintle valves for internal combustion engines; and most particularly, to apparatus and method for preventing entry of exhaust gas components, especially moisture, into a valve's solenoid actuator.

BACKGROUND OF THE INVENTION

Pintle valves are well known for use in controlling flow of fluids, and especially gases. For example, the recirculation of a portion of the exhaust stream of an internal combustion engine into the intake manifold thereof is typically accomplished via a solenoid-actuated pintle valve. Such applications can expose a valve's internal surfaces and moving parts to fouling materials. A pintle-type exhaust gas recirculation (EGR) valve is exposed to moisture-laden corrosive materials which can seep into the clearance between the valve pintle shaft and the pintle bushing. Such materials can deposit as undesirable coking on the shaft, but can also pass through the bushing and enter the solenoid actuator where they can cause impairment or failure of the actuator.

The moisture intrusion phenomenon is facilitated by the fact that a journal shaft bearing (bushing) is employed that inherently incorporates radial clearances to minimize hysteresis. Such clearances can allow corrosive gases to leak past the bushing in small amounts, which gases are known to condense within the solenoid actuator, causing corrosion of the coils and eventually electrical short-circuiting.

In some prior art EGR valves, a space is provided between the valve body and the actuator, which space may be vented to permit escape of such gases leaking along the bushing, preventing the gases from being forced into the actuator solenoid. However, such vents may also permit ingress of external contaminants, especially water and road contaminants when a valve is subjected to intense spray or temporary immersion. These contaminants may then be drawn into the actuator and also cause mechanical and/or electrical failure of the device.

What is needed in the art is a means for keeping corrosive gases being regulated by a pintle-type valve from reaching entry points on an associated solenoid actuator.

It is a principal object of the present invention to increase the reliability of an exhaust gas recirculation valve by preventing contaminating materials from passing through the valve bushing and entering the solenoid actuator.

SUMMARY OF THE INVENTION

Briefly described, in a solenoid-actuated valve having a pintle shaft extending from a metering base sub-assembly into a solenoid sub-assembly, the pintle shaft is equipped with a radially-extending fixed shield outside the metering base sub-assembly. The shield thus moves axially with the pintle during valve actuation. The shield is so located axially on the pintle that when the pintle is in the valve-closed position, the shield makes contact with, or is in very close proximity to, the pintle bushing of the metering base sub-assembly, thus serving as an effective barrier or impedance to leakage of gases. When the valve is in the fully open position at the opposite extreme of pintle travel, the shield makes contact with, or is in very close proximity to, an armature shield in the actuator sub-assembly, thus serving to impede entrance into the solenoid by any gases leaked from the metering base sub-assembly.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

A solenoid-actuated pintle valve assembly in accordance with the invention may be better understood by first considering a prior art pintle valve assembly.

Figure 1:
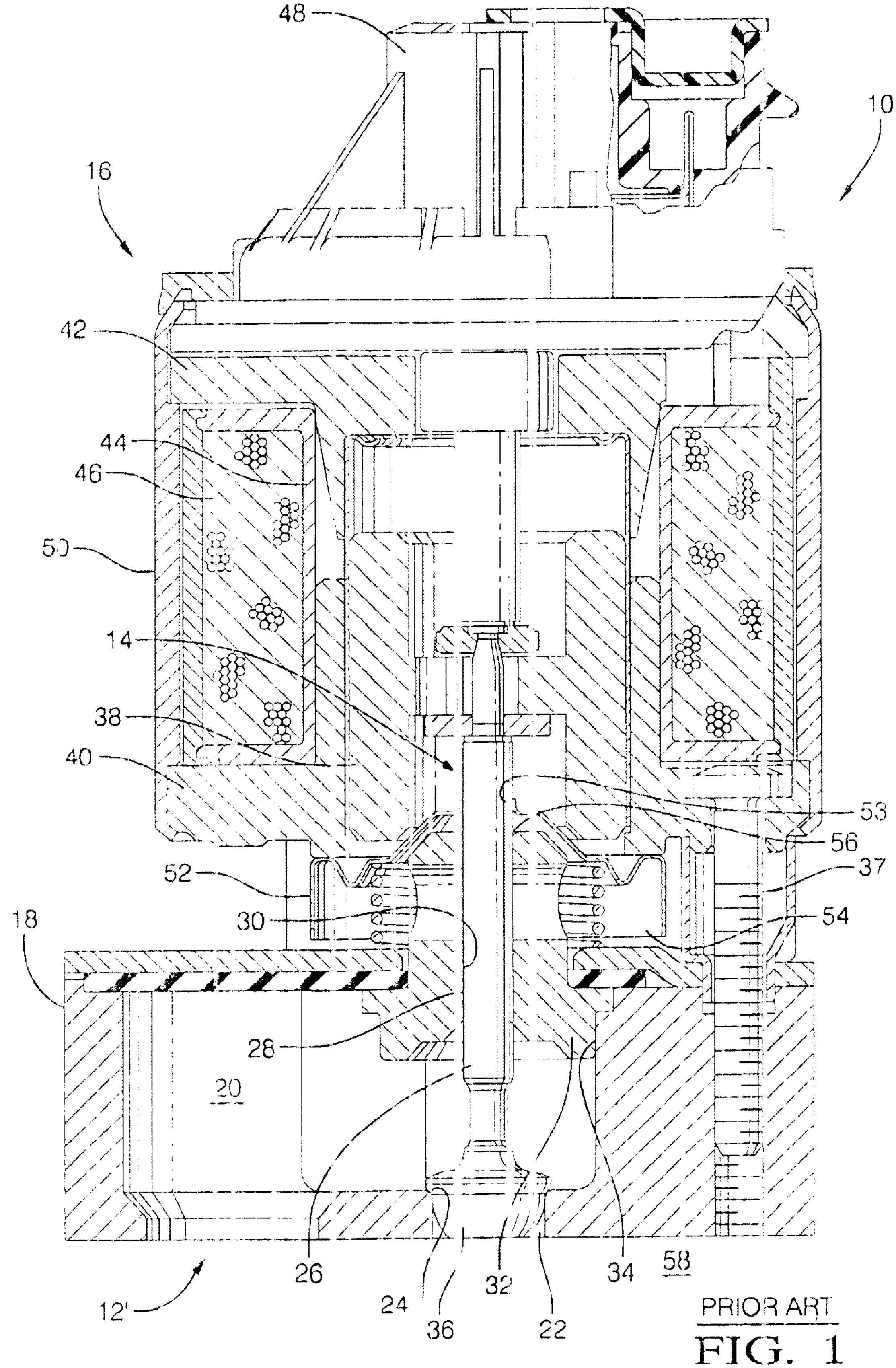
FIG. 1 is an elevational cross-sectional view of a prior art pintle valve assembly.

Referring to FIG. 1, a prior art pintle-type valve assembly 10 includes a metering base sub-assembly 12, a pintle sub-assembly 14, and an actuating sub-assembly 16. Valve body 18 comprises a first chamber 20 and a second chamber 22 separated by an annular valve seat 24. A pintle shaft 26 having a surface 28 is slidably disposed in first axial bore 30 in bushing 32 which is mounted in a second axial bore 34 in valve body 18. Valve head 36 is fixedly attached to shaft 26 for axial movement therewith and is matable with valve seat 24 to regulate flow across seat 24 between chambers 20 and 22 in known fashion.

Pintle shaft 26 extends from metering base assembly 12 via bushing 32 into solenoid actuator sub-assembly 16 which is attached to valve body 18 as by bolt(s) 37. Sub-assembly 16 comprises an armature 38, first pole piece 40, second pole piece 42, spool 44, windings 46, and connector cap 48. A housing 50 surrounds the electromechanical elements. An armature shield 52 has a generally inverted cup shape, having a central opening 53 at its upper end for close-fitting passage of pintle shaft 26 therethrough, and being open at a lower end 54 to permit escape of gases which may creep along bore 30 to the upper end 56 of bushing 32. A perceived advantage of bushing 32 is its length, which provides for a relatively long migration path for gases from chamber 20. A disadvantage, however, is that any gases escaping at end 56 are discharged immediately adjacent actuator sub-assembly 16, and relatively distant from lower shield end 54, and thus are readily admissible via opening 53 to the interior of the actuator.

A pintle valve assembly such as valve assembly 10 may be mounted on an internal combustion engine 58 for use as an exhaust gas recirculation valve in known fashion. In such use, chambers 20 and 22 are fully exposed to engine exhaust gases. The object of the invention, in this or any other pintle valve application, is to prevent gas from leaking from chamber 20 along bore 30 and thence into actuator sub-assembly 16.

Figure 2:
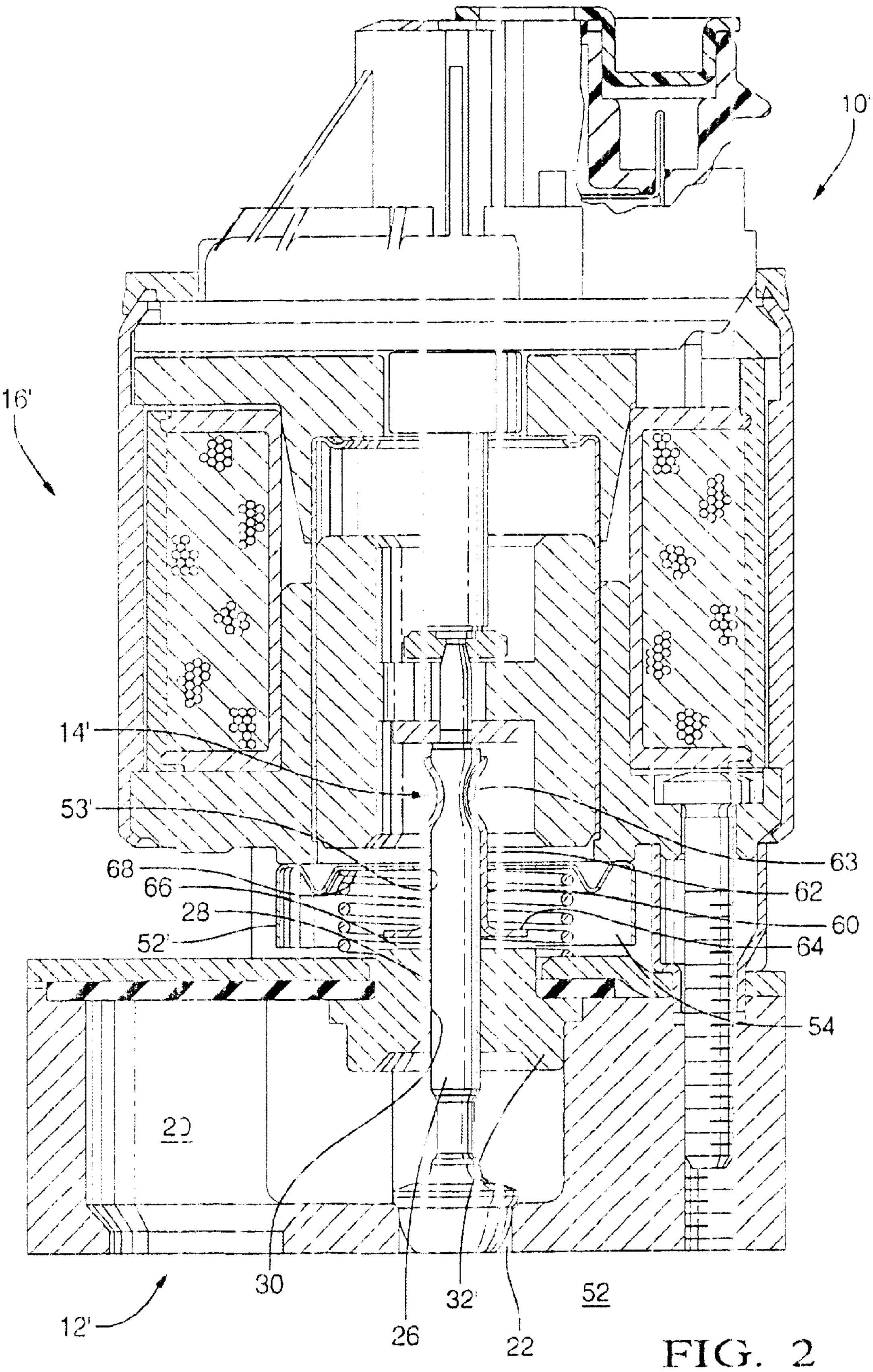
FIG. 2 is an elevational cross-sectional view showing the valve assembly shown in FIG. 1 modified with a pintle shield in accordance with the invention.

Referring to FIG. 2, an improved pintle valve assembly 10' in accordance with the invention includes a similar actuator sub-assembly 16', metering base sub-assembly 12', and pintle sub-assembly 14', modified as described below.

One object of the invention is to provide an impediment to creep of gas along the surface 28 of the pintle through bore 30. A second object is to divert in a radial direction any gas escaping through bushing bore 30. A third object is to make such escape immediately adjacent open lower end 54 of modified armature shield 52'. A fourth object is to practically block exit of gas from bore 30 when the valve assembly is in the closed position. A fifth object is to practically block entrance of gas into actuator sub-assembly 16 when the valve assembly is in the open position. A sixth object is to achieve the first five objects with little to no required modification of the existing prior art pintle valve assembly design.

These objects are achieved by inclusion of a pintle shield 60 fixedly attached to pintle shaft 26 and axially actuable with it by solenoid sub-assembly 16. Shield 60 includes a generally cylindrical axial portion 62 for sealingly engaging pintle shaft 26 as by crimping 63 and a radial flange portion 64 generally orthogonal to shaft 28 and generally parallel to the upper surface 66 of modified pintle bushing 32'. Bushing 32 is shortened to 32' to provide room within the existing footprint for shield 60. Shield 60 is positioned axially of pintle shaft 26 such that flange 64 is in contact, or nearly so, with surface 66 when the valve assembly is fully closed. In this position, the flange serves as an effective barrier or impediment to leakage of gas. The flange diminishes axial momentum of leaking gas and channels the gas outwardly and away from the actuator sub-assembly 16. Likewise, improved armature shield 52' is shortened axially such that flange 64 is in contact, or nearly so, with inner surface 68 of shield 52' when the valve assembly is fully opened. In this position, the flange closes off possible leak paths along shaft 26 into the actuator. Further, opening 53' in improved armature shield 52' is larger than opening 53 in shield 52 to closely admit pintle shield 60 therethrough.

It will be obvious that the first five objectives listed above are accomplished by a pintle shaft shield in accordance with the invention, and that the sixth objective is also achieved in that only minor and inexpensive revisions of the pintle shaft and armature shield are required to accommodate the novel shaft shield.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A pintle type valve assembly, comprising:

a) a metering base sub-assembly;

b) an actuator sub-assembly attached to said metering base sub-assembly;

c) a pintle shaft sub-assembly extending through a bore in said metering base sub-assembly into said actuator sub-assembly; and d) a shield disposed on said pintle shaft between said metering base sub-assembly and said actuator sub-assembly, said shield including means for attachment to said shaft and a radial flange extending along a surface of said metering base sub-assembly for cooperating with said surface at a first extreme of axial actuation of said pintle shaft to impede leakage of gas from said metering base sub-assembly along said bore.

2. A pintle type valve assembly in accordance with claim 1 wherein said metering base sub-assembly comprises a bushing for said pintle shaft, said bore being formed in said bushing, and wherein said surface is an outer surface of said bushing, and wherein said outer bushing surface cooperates with said flange.

3. A pintle type valve assembly in accordance with claim 1 wherein said actuator sub-assembly comprises an armature shield having an opening therethrough for passage of said pintle shaft, and wherein said armature shield cooperates with said flange at a second extreme of axial actuation of said pintle shaft to impede leakage of gas from said metering base sub-assembly into said actuator sub-assembly.

4. A pintle type valve assembly in accordance with claim 1 wherein said assembly is an exhaust gas recirculation valve for use with an internal combustion engine.

5. An internal combustion engine, comprising an exhaust gas recirculation valve, including a metering base sub-assembly, an actuator sub-assembly attached to said metering base sub-assembly, a pintle shaft sub-assembly extending through a bore in said metering base sub-assembly into said actuator sub-assembly, and a shield disposed on said pintle shaft between said metering base sub-assembly and said actuator sub-assembly, said shield including means for attachment to said shaft and a radial flange extending along a surface of said metering base sub-assembly for cooperating with said surface at a first extreme of axial actuation of said pintle shaft to impede leakage of gas from said metering base sub-assembly along said bore.

* * * * *